Figure 1:
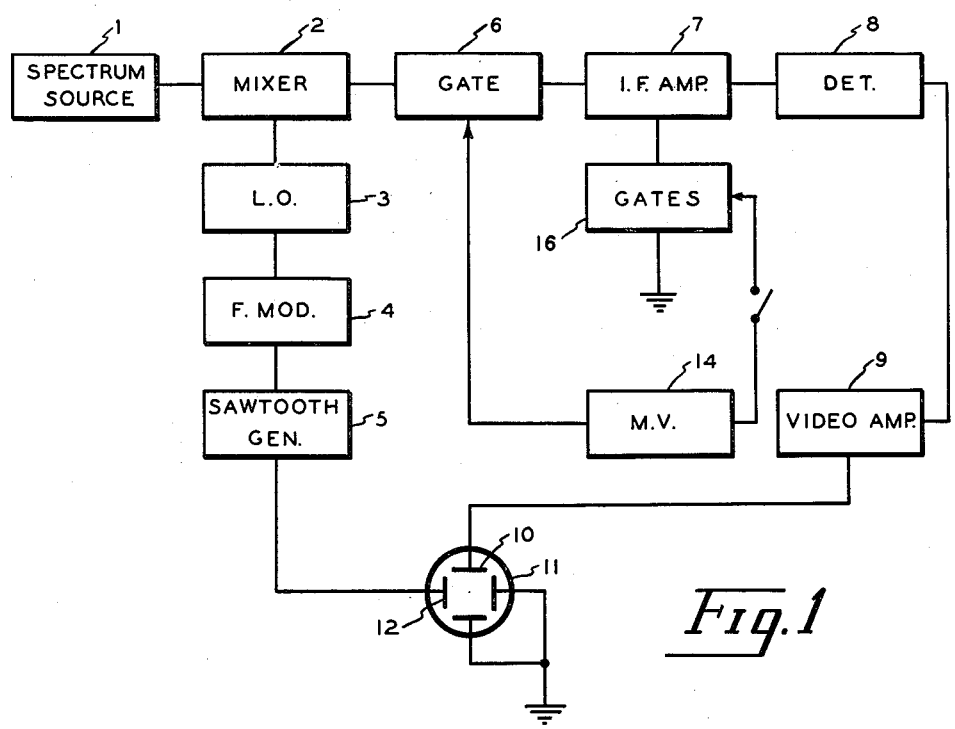

Jan. 3, 1961 H. HURVITZ 2,967,273
SPECTRUM ANALYZER
Filed June 27, 1956

INVENTOR
Hyman Hurvitz
BY
ATTORNEY

United States Patent Office 2,967,273
Patented Jan. 3, 1961

2,967,273
SPECTRUM ANALYZER

Hyman Hurvitz, 1313 Juniper St., Washington, D.C.

Filed June 27, 1956, Ser. No. 594,216

8 Claims. (Cl. 324—77)

The present invention relates generally to scanning spectrum analyzers, and more particularly to systems for reducing the required frequency scan time in such systems, and particularly in frequency scanning superheterodyne spectrum analyzers.

It is well known, in frequency scanning spectrum analyzers of the superheterodyne type, in which a local oscillator frequency is scanned to bring successive portions of a spectrum under examination to within the pass band of an I.F. amplifier, that the rate of scan of the local oscillator frequency in c.p.s.p.s. must be proportioned to the width of the I.F. amplifier, for optimum resolution, and accordingly that for low resolution, i.e. for visual separation of closely adjacent frequencies, a relatively slow scan is required. Quantitative relations are available in the patented art and in the literature, and it is of interest that for analyzing low frequency audio or sub-audio spectra scan times of over a minute may be required, since resolutions required may be of the order of a fraction of a c.p.s.

It is a broad object of the present invention to provide a system of spectrum analysis in which no necessary relation exists between scan time and resolution, i.e. in which scan time is independent of resolution.

The object of the present invention is attained, generally, by including in the I.F. amplifier of a frequency scanning superheterodyne spectrum analyzer, a component which may be described in a broad sense as a super-regenerative element. More specifically, a very high gain amplifier, or a highly regenerative amplifier, may be included as the added element in cascade with the I.F. channel, or as part of the I.F. chain. This element may be keyed on and off at a rapid rate, say by a square wave. When keyed off the tuned circuits of the element may be highly damped, so that decay time is substantially zero. The keyed-on time of the element is entirely inadequate to permit the element to attain maximum amplitude. However, the total amplitude of the built up signal during each keyed-on period is logarithmically proportional to the input signal, since the input signal is regenerating or increasing at a logarithmic rate during the on-key period. By having a sufficiently high gain system, as little as 1% or 1/10% of maximum build-up may be permitted to occur, which reduces the time required to sense the amplitude of a signal approximately by that same factor. In the conventional system maximum build-up of signal in the I.F. channel is always required to occur. In the present system it is never permitted to occur. A loss in gain of the overall system occurs, by reason of the described keying operation. This loss in gain would be by a factor of about 1000. if the build-up is stopped when the signal attains 1/1000. of its maximum value. However, compensation for the loss of gain is readily attained by adding a stage or two to the I.F. amplifier.

Figure 2:
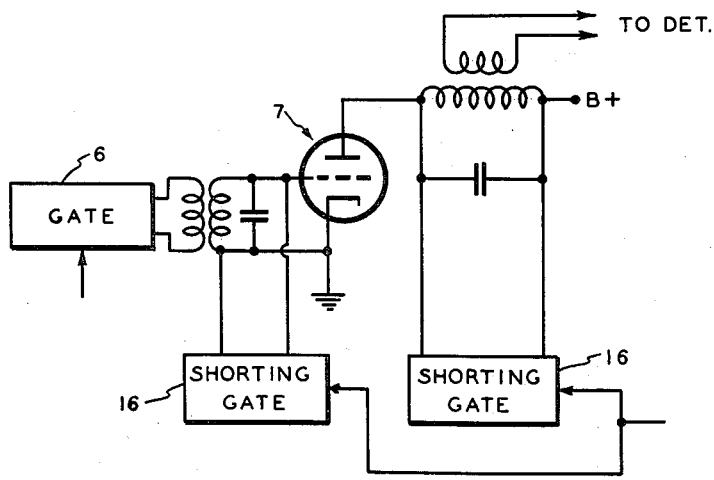

The above and still further objects, features and advantages of the present invention will become apparent upon consideration of the following detailed description of one specific embodiment thereof, especially when taken in conjunction with the accompanying drawings, wherein:

Figure 1 is a block diagram of a superheterodyne spectrum analyzer in accordance with the invention; and Figure 2 illustrates schematically an element of the system of Figure 1.

Referring now more particularly to the accompanying drawings, the reference numeral 1 denotes a wide band spectrum source, which is to be analyzed for frequency content. More specifically, a plot is to be generated of amplitude versus frequency. The band of frequencies provided by source 1 is applied to a mixer 2, to which is also applied the output of a frequency scanning local oscillator 3. Frequency modulation is accomplished conventionally by a frequency modulator 4 and sawtooth generator 5.

The output of mixer 2 is applied to a gate 6, normally open, which passes signal to an I.F. amplifier 7. When gate 6 is off no I.F. signal is supplied to the amplifier 7. The output of the latter is detected, and video amplified, by detector 8 and amplifier 9, and the output of the latter is applied to the vertical deflection electrode 10 of a CRT 11. To the horizontal deflection electrode 12 of CRT 11 is applied sawtooth voltage from generator 5.

The I.F. amplifier 7 has a predetermined pass band $\Delta f$. In conventional systems of scanning spectrum analysis the band-width $\Delta f$ must be selected with due regard for the scanning rate $$\frac{df}{dt}$$

of oscillator 3, by virtue of the fact that $$\Delta f = 1.4 \sqrt{\frac{df}{dt}}$$

for optimum response of the I.F. amplifier.

In accordance with the present system the band-width of amplifier 7 may be narrowed by a large factor, as high as 1000. or more, from that required by the recited relation. The gate 6 is turned on and off, in succession by pulses supplied by multivibrator 14, and the time that gate 6 is permitted to be on is for less than is required for the I.F. amplifier to attain its maximum response. This reduction factor may be of the order of 1000. if desired. However, the amplitude of response which is attained is a logarithmic function of the amplitude of input signal to the amplifier. When multi-vibrator 14 turns gate 6 off, it may turn on gates 16, which serve to short circuit the tuned circuits of the I.F. amplifier, discharging their energy instantaneously. The latter function is, however, permissive, and if eliminated the stored energy of I.F. amplifier 7 decays of its own accord, and this decay occurs in a short time because the amplitude of the signal is small.

The I.F. amplifier 7 may include one or more stages, at least one of which must be of the required selectivity and must be gated on and off periodically. Other stages may be wide band stages, if desired, although obviously if only the gate 6 is employed, and not gates 16, the entire I.F. amplifier, and all its stages, may be of the same selectivity.

The detector 8 may, if desired, include filter elements for filtering out the gating frequency. The latter will usually be many times the scan frequency, perhaps 100 to 500, so that filtering or smoothing of the video signal will present no problem. Obviously, also filtering may be dispensed with, in which case the CRT display will consist of horizontally spaced vertical spikes.

Further, the I.F. amplifier 7 may be or include regenerative elements and circuits, to decrease rise time.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. In a superheterodyne scanning spectrum analyzer comprising a mixer, a local oscillator coupled to said mixer, means for frequency scanning the frequency of said local oscillator over a frequency band equal in width to the width of a spectrum under analysis, means for applying said spectrum under analysis to said mixer, and an I.F. amplifier connected to said mixer for deriving frequency converted signals therefrom, the combination in which said I.F. amplifier has a selectivity smaller than required for substantially optimum response in view of the scanning rate of said local oscillator, and in which is provided means for periodically gating said I.F. amplifier on for periods substantially less than required for said I.F. amplifier to attain maximum response to a signal.

2. In a system of spectrum analysis, for analyzing a band of frequencies, a filter having a desired selectivity, whereby said filter has a predetermined normal build-up and decay time, means for applying successive sub-bands of said band of frequencies in succession to said filter for transfer thereby, means for gating said filter on and off periodically, the on time of said means for gating being less than is required by said filter to attain maximum response to a signal to which it is substantially tuned, and means for draining the stored energy of said filter during the off time of said means for gating at a rate greater than the normal decay rate of said filter, and means for visually indicating the amplitude of the response of said filter for each of said sub-bands.

3. In a system of spectrum analysis, a frequency scanning superheterodyne receiver having an intermediate frequency amplifier stage, said intermediate frequency amplifier stage having a predetermined selectivity, whereby said intermediate frequency amplifier stage has a predetermined build-up time and a predetermined decay time in response to a signal to which it is tuned, and means for periodically gating said intermediate frequency amplifier stage on for periods each substantially less than said predetermined build-up time, and means for visually indicating the amplitude of response of said intermediate frequency amplifier stage during each of said periods.

4. The combination in accordance with claim 3 wherein each of said periods is less than 10% of said predetermined build-up time.

5. The combination in accordance with claim 3 wherein each of said periods is less than 1% of said predetermined build-up time.

6. The combination in accordance with claim 3 wherein each of said periods is less than .1% of said predetermined build-up time.

7. The combination in accordance with claim 3 wherein is further provided means for decreasing said predetermined decay time at times intermediate each of said periods.

8. The combination in accordance with claim 3 wherein is further provided means for effecting substantially complete and rapid decay of the A.C. energy of said filter in the intervals between gating on of said intermediate frequency amplifier stage.

References Cited in the file of this patent

UNITED STATES PATENTS

| | | |
|---|---|---|
| 2,293,135 | Hallmark | Aug. 18, 1942 |
| 2,455,052 | Fisher | Nov. 30, 1948 |
| 2,498,954 | Heller | Feb. 28, 1950 |
| 2,517,977 | Cole | Aug. 8, 1950 |
| 2,525,675 | Heller | Oct. 10, 1950 |
| 2,537,132 | Guanella | Jan. 9, 1951 |
| 2,577,758 | Hastings | Dec. 11, 1951 |
| 2,594,535 | Bertram | Apr. 29, 1952 |
| 2,639,425 | Russell | May 19, 1953 |
| 2,680,151 | Boothroyd | June 1, 1954 |
| 2,755,437 | Johnson | July 17, 1956 |
| 2,780,807 | Frank | Feb. 5, 1957 |
| 2,794,952 | Golden | June 4, 1957 |